United States Patent
Filka et al.

(10) Patent No.: US 8,604,735 B2
(45) Date of Patent: Dec. 10, 2013

(54) METHOD AND APPARATUS FOR CONTROL OF AN AC ELECTRIC MOTOR WITH FIELD WEAKENING

(75) Inventors: Roman Filka, Roznov Pod Radhostem (CZ); Peter Balazovic, Roznov Pod Radhostem (CZ)

(73) Assignee: Freescale Semiconductor, Inc., Austin, TX (US)

( * ) Notice: Subject to any disclaimer, the term of this patent is extended or adjusted under 35 U.S.C. 154(b) by 337 days.

(21) Appl. No.: 12/988,828

(22) PCT Filed: May 16, 2008

(86) PCT No.: PCT/IB2008/051933
§ 371 (c)(1),
(2), (4) Date: Oct. 21, 2010

(87) PCT Pub. No.: WO2009/138821
PCT Pub. Date: Nov. 19, 2009

(65) Prior Publication Data
US 2011/0050152 A1   Mar. 3, 2011

(51) Int. Cl.
*H02P 7/00* (2006.01)

(52) U.S. Cl.
USPC .............. 318/432; 318/493; 318/521

(58) Field of Classification Search
USPC ........... 318/432, 493, 521, 719, 376, 400.23, 318/400.13, 700, 807, 809, 804
See application file for complete search history.

(56) References Cited

U.S. PATENT DOCUMENTS

| | | | |
|---|---|---|---|
| 5,739,664 A | 4/1998 | Deng et al. | |
| 6,163,128 A | 12/2000 | Hiti et al. | |
| 6,288,515 B1 | 9/2001 | Hiti et al. | |
| 6,965,212 B1 | 11/2005 | Wang et al. | |
| 2004/0036434 A1 | 2/2004 | Chen et al. | |
| 2007/0222406 A1 | 9/2007 | Atarashi et al. | |
| 2012/0306423 A1* | 12/2012 | Si et al. ............ | 318/493 |

FOREIGN PATENT DOCUMENTS

| | | |
|---|---|---|
| EP | 0877474 A2 | 11/1998 |
| EP | 1672780 A2 | 6/2006 |
| JP | 9046809 A | 2/1997 |

OTHER PUBLICATIONS

International Search Report and Written Opinion correlating to PCT/IB2008/051933 dated Jul. 2, 2010.

* cited by examiner

*Primary Examiner* — Karen Masih

(57) ABSTRACT

A method and apparatus for control of an alternating current electric motor with field weakening, including setting a required operating point for a motor field voltage component as a function of a difference between actual and required motor field current components, and setting a required operating point for a motor torque voltage component as a function of a difference between actual and required motor torque current components. The method also includes setting a field weakening constituent for the required operating point for the motor field voltage component as a function of a difference between a required operating point and an available value of the motor torque voltage component and as a function of a difference between actual and required motor torque current components.

20 Claims, 3 Drawing Sheets

METHOD AND APPARATUS FOR CONTROL OF AN AC ELECTRIC MOTOR WITH FIELD WEAKENING

FIELD OF THE INVENTION

This invention relates to control of an AC electric motor with field weakening.

BACKGROUND OF THE INVENTION

An electric motor has a base speed, up to which the maximum torque the motor can develop is substantially constant, whether the motor is running in the forward direction or reverse. Modern drive controllers are designed so that the motor can be run faster than the base speed, up to a maximum speed, albeit with reduced torque, with resulting better performance, or with the same performance from a more economical motor in terms of its rating and/or power consumption.

While the motor speed is lower than the base speed, the power supply can provide enough voltage in spite of the back electro-motive force ('EMF') that the motor generates. At motor speeds greater than the base speed however, field (magnetic flux) weakening is utilized to reduce the effective back EMF. In the case of a permanent magnet motor, for example, field weakening may be obtained by the field-producing stator current vector being displaced relative to its rotating axis.

The field weakening technique is especially important in the case of variable speed drives. Nowadays a vast majority of variable speed AC motors/drives is designed to be operated under conditions of voltage and current saturation, thus achieving a maximum utilization of current and voltage limits of all system components. This approach helps to achieve cost savings in an overall drive design.

Many field weakening techniques are known. U.S. Pat. No. 6,163,128 describes a method and drive system for controlling a permanent magnet synchronous machine. The controller described uses Q-axis current component error compared against a "pre-determined threshold" for operation in field-weakening as well as for transition from field-weakening back to normal operation and it is therefore necessary to determine that threshold. Also, if an absolute value of regulation error of the Q-axis current component controller is less than the "pre-determined threshold", the field-weakening current component is discontinuously set to zero, giving rise to nonlinear behavior. In addition, the system described uses a filter, which can give rise to other performance problems.

U.S. Pat. No. 6,965,212 describes a method and apparatus for field weakening control in an AC motor drive system. The controller described uses the difference between voltage component limitation and the required Q-axis voltage component, notably its signum, for operation in field-weakening as well as for transition from field-weakening back to normal operation, which corresponds with a constant set-point. The field-weakening current component is generated using Q-axis current controller windup.

SUMMARY OF THE INVENTION

The present invention provides a method and an apparatus for control of an alternating current electric motor with field weakening as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the drawings are illustrated for simplicity and clarity and have not necessarily been drawn to scale.

DETAILED DESCRIPTION OF THE PREFERRED EMBODIMENTS

Figure 1:
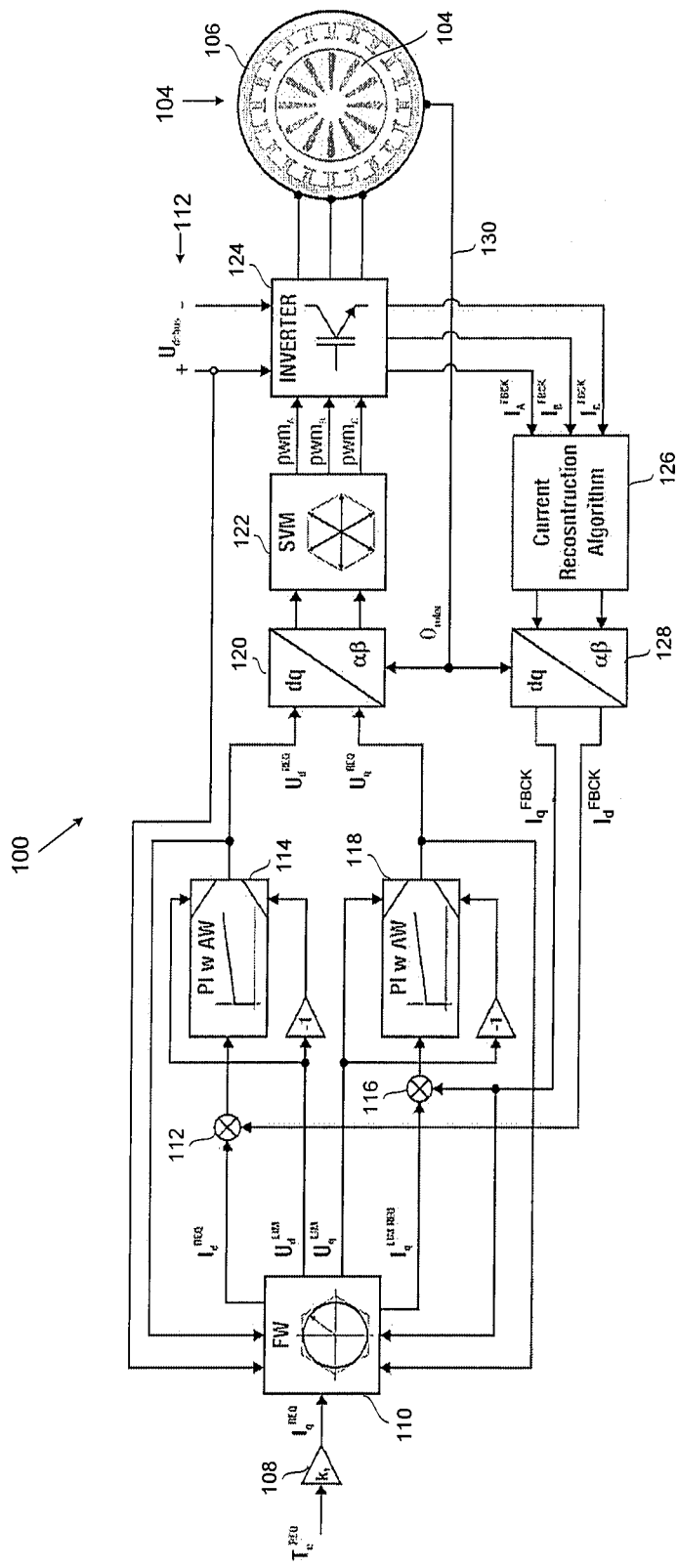
FIG. 1 is a schematic diagram of an example of a controller in accordance with an embodiment of the present invention for an alternating current electric motor.

FIG. 1 shows a controller 100 in accordance with an embodiment of the present invention for an alternating current ('AC') electric motor 102 which has a rotor 104 and a stator 106. This embodiment is illustrated as applied to a permanent magnet motor but is also applicable to other AC motors such as wound-rotor synchronous motors and asynchronous induction motors. The controller of FIG. 1 calculates values in rotating direct ('D-axis') and quadrature ('Q-axis') coordinates before converting the values to static $\alpha$, $\beta$ angular coordinates then to static three phase A,B,C components, which are applied to three-phase windings of the stator 106.

The controller shown in FIG. 1 receives a required torque signal $T_e^{REQ}$, which may be generated manually or automatically, depending on a desired torque directly or depending on a desired speed or position of the rotor of the motor 102, for example. The required torque signal $T_e^{REQ}$ is input to a proportionality element 108 whose gain $k_t$ defines a value $I_q^{REQ}$ representing a corresponding required torque current component in the Q-axis. The controller generates values $U_d^{REQ}$, representing the required operating point for the D-axis motor field voltage component needed to obtain the required field current component $I_d^{REQ}$, and $U_q^{REQ}$, representing the required operating point for the Q-axis motor torque voltage component needed to obtain the required torque current component $I_q^{REQ}$.

The field-weakening technique is efficient and robust and also takes account of transients, such as rapid changes in required torque or speed commands or in load, including the phenomenon known as windup in conditions of voltage and current saturation. If the field-weakening technique were not implemented optimally it could cause a considerable degradation of overall drive performance or even system instability in a speed-range above the base speed.

More specifically, the required torque current component value $I_q^{REQ}$ is input to a field (magnetic flux) weakening module 110. The field weakening module 110 calculates a required value of a field weakening constituent $I_d^{REQ\_FW}$ of a field producing D-axis current component $I_d^{REQ}$, notably for operation of the motor in field weakening conditions. In the case of a permanent magnet synchronous motor, the field producing current is normally kept zero, for speeds below the base speed, as the initial magnetizing flux is provided by the magnets, so that $I_d^{REQ}=0$ for speeds below base speed and $I_d^{REQ}<0$ during field weakening. However in the case of an AC induction motor, for example, this is not the case, and a magnetizing current has to be created by the field producing D-axis current. Therefore for speeds below the base speed $I_d^{REQ}>0$ ($I_d^{REQ}=I_d^{NORM}$) and above the base speed $I_d^{REQ}<I_d^{NORM}$. The field weakening module 110 also imposes voltage limits $U_d^{LIM}$ and $U_q^{LIM}$ on the D-axis field voltage component and the Q-axis torque voltage component based on available supply voltage, in this case a voltage $U_{DCbus}$ from a DC bus 112, in order to prevent windup of the current controllers under voltage saturation. In addition, the field weakening module 110 imposes a limit $I_d^{MAX}$ on the required value $I_d^{REQ}$ of the field current component, being smaller than the rated phase current $I^{MAX}$ in the case of a permanent magnet motor in order to avoid irreversible demagnetization of the permanent magnet, and imposes a limit $I_q^{LIM}$ on the required value $I_q^{REQ}$ of the torque producing current component, as a function of the current available within the maximum phase current $I^{MAX}$ after supplying the required value $I_d^{REQ}$ of the field current component.

The required D-axis field current component value $I_d^{REQ}$ is compared in a comparator 112 with a value $I_d^{FBCK}$ representing the actual value of the D-axis field current component applied to the stator 106 and the difference $I_d^{REQ}-I_d^{FBCK}$ is then fed as input to a D-axis proportional-integral control element 114. The D-axis proportional-integral control element 114 generates the output value $U_d^{REQ}$ representing the required operating point for the D-axis motor field voltage component needed to obtain the required field current component $I_d^{REQ}$, with a component proportional to its input and an integral component which accumulates progressively in time as a function of its input. The voltage limit value $U_d^{LIM}$ and its inverse $-U_d^{LIM}$ are applied to the proportional-integral control element 114 so that the output value $U_d^{REQ}$ is maintained within the bounds $U_d^{LIM}$ and its inverse $-U_d^{LIM}$. Between the bounds $U_d^{LIM}$ and $-U_d^{LIM}$, the output value $U_d^{REQ}$ representing the required operating point for the D-axis motor field voltage component is a continuously progressive function, without discontinuity, of the difference $I_d^{REQ}-I_d^{FBCK}$.

The limited required Q-axis torque current component value $I_q^{LIM\_REQ}$ is compared in a comparator 116 with a value $I_q^{FBCK}$ representing the actual value of the Q-axis torque current component applied to the stator 106 and the difference $I_q^{REQ}-I_q^{FBCK}$ then fed as input to a Q-axis proportional-integral control element 118. The Q-axis proportional-integral control element 118 generates an output value $U_q^{REQ}$ representing the operating point Q-axis motor torque voltage component needed to obtain the required field current component $I_q^{REQ}$, with a component proportional to its input and an integral component which accumulates progressively in time as a function of its input. The voltage limit value $U_q^{LIM}$ and its inverse $-U_q^{LIM}$ are applied to the proportional-integral control element 118 so that the output value $U_q^{REQ}$ is maintained within the bounds $U_q^{LIM}$ and its inverse $-U_q^{LIM}$. Between the bounds $U_q^{LIM}$ and $-U_q^{LIM}$, the output value $U_q^{REQ}$ representing the required operating point for the Q-axis motor torque voltage component is a continuously progressive function, without discontinuity, of the difference $I_q^{LIM\_REQ}-I_q^{FBCK}$.

The D-axis motor field voltage component required operating point $U_d^{REQ}$ and the Q-axis motor torque voltage component required operating point $U_q^{REQ}$ are then subjected to an inverse Park transformation in a module 120, which transforms the required voltage vector components in rotating DQ coordinate system to components in stationary αβ angular coordinate system (DQ to AC transformation) and are then applied to a Space Vector Modulation element 122, which calculates duty-cycles for three phase A,B,C components, which are applied by pulse-width modulation of three switching legs of an inverter 124 supplied with power from the DC bus 112 to the three-phase windings of the stator 106. Suitable techniques for Park (DQ to AC) transformation and for Space Vector Modulation are known and are referred to for example in U.S. Pat. No. 6,163,128.

A feedback current reconstruction element 126 calculates the equivalent in the αβ angular coordinate system of measured or observed three-phase current components $I_A^{FBCK}$, $I_B^{FBCK}$, and $I_C^{FBCK}$ in the stator corresponding to the pulse-width modulated voltage components that the inverter 124 applies to the stator 106 and a Park transformation module 128 transforms the currents' vector components in stationary αβ angular coordinate system to the rotating DQ coordinate system to produce the feedback actual current component values $I_d^{FBCK}$ and $I_q^{FBCK}$. The feedback actual torque current component value $I_q^{FBCK}$ is supplied as input to the field weakening module 110 as well as to the comparator 116. The inverse Park transformation module 120 and the Park transformation module 128 are supplied with rotor angular position data $\theta_{rotor}$ over a line 130 from a rotor position sensor.

Figure 2:
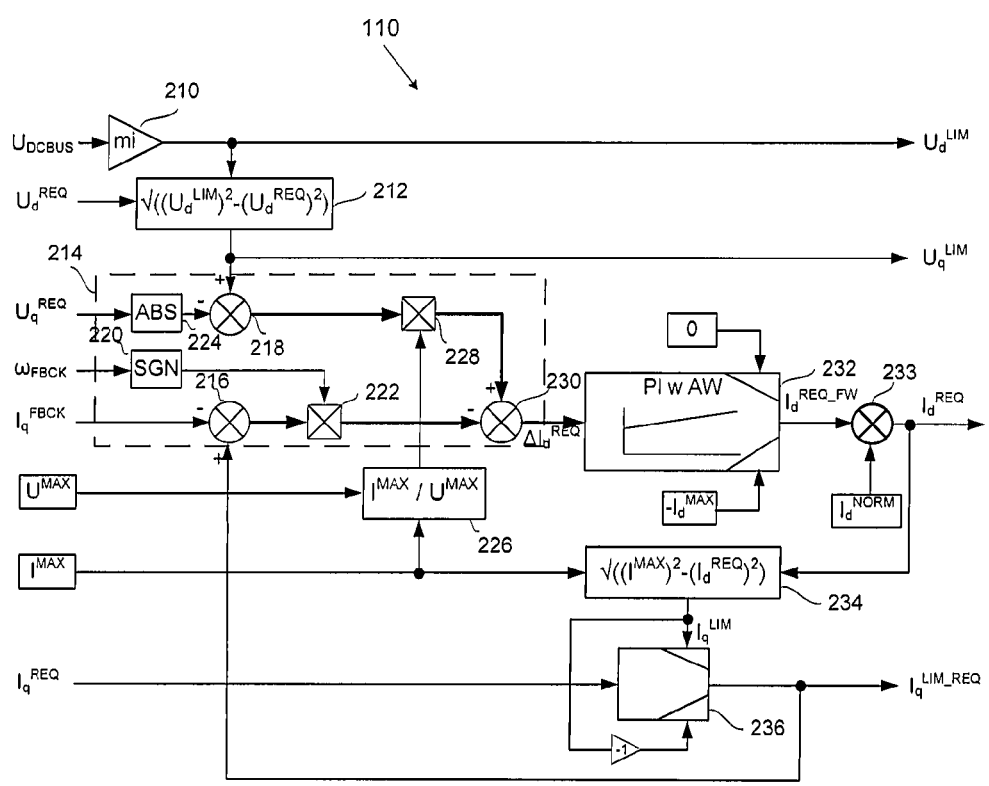
FIG. 2 is a schematic diagram of an example of a field weakening module in the controller of FIG. 1, and FIGS. 3 and 4 are graphs of operational variables of the controller of FIGS. 1 and 2 with and without field weakening.

FIG. 2 shows the field weakening module 110 in more detail. A modulation index factor mi is applied to the voltage value from the DC bus 112 in an element 210 as a function of the pulse-width modulation to calculate the voltage saturation limit $U_d^{LIM}$ for the D-axis field voltage component, the modulation index factor mi being $1/\sqrt{3}$ in the present embodiment of the invention, with the three-phase space vector modulation element 122: $U_d^{LIM}=mi*U_{DCbus}$.

The voltage saturation limit $U_q^{LIM}$ for the Q-axis torque voltage component is then calculated in an element 212 as a function of the available voltage after calculating the voltage saturation limit $U_d^{LIM}$ for the D-axis field voltage component and after setting the required operating point $U_d^{REQ}$ for the field voltage component in the control element 114. More specifically, the element 212 calculates:

$$U_q^{LIM}=\sqrt{((U_d^{LIM})^2-(U_d^{REQ})^2)}$$

so that the voltage limit $U_q^{LIM}$ is equal to the headroom available after setting the field D-axis voltage component, that is to say the amplitude of the vector difference between $U_d^{LIM}$ and $U_d^{REQ}$. The control priority is on setting the field voltage operating point, with the torque voltage operating point being set as a function of the available headroom remaining.

The field weakening module 110 also includes a calculator 214 which calculates a bidirectional difference value $\Delta I_d^{REQ}$ for the motor D-axis field current component (magnetic flux). The bidirectional function ensures satisfactory stable control when entering the field weakening operation region and operation under voltage saturation and at the same time it also ensures safe recovery of the control when leaving the field weakening region. The bidirectional field error calculator 214 combines a comparator 216 calculating Q-axis torque current component error ($I_q^{LIM\_REQ}-I_q^{FBCK}$) for achieving correct operation under voltage saturation (transition to the field weakening condition) with a comparator 218 calculating Q-axis voltage component headroom margin ($U_q^{LIM}-U_q^{REQ}$) for achieving correct operation when recovering from voltage saturation (transition from field weakening condition). To correct for forward and reverse rotation of the motor, the signum of a value $\omega_{FBCK}$ representing the angular speed of the rotor 104 is obtained in an element 220 and applied to a multiplier element 222 which receives the output of the comparator 216 to change the signum of the comparison in the case of reverse rotation. The absolute value of the input $U_q^{REQ}$ to the comparator 218 is calculated in an element 224 to correct for inversion of the sign of the required torque voltage $U_q^{REQ}$ in reverse rotation, the calculated Q-axis voltage saturation limit $U_q^{LIM}$ always being positive. The scale of the Q-axis voltage component headroom value $U_q^{LIM}-U_q^{REQ}$ is altered to correspond with the scale of the Q-axis torque current component error $I_q^{LIM\_REQ}-I_q^{FBCK}$ by dividing a value $U^{MAX}$ representing the maximum voltage scale by a value $I^{MAX}$ representing the maximum phase current scale in a divider and applying the resulting correction factor to a multiplier 228 which receives the output of the comparator 218. The scaled Q-axis voltage component headroom value from the multiplier 228 is applied to the positive input of a subtractor 230, whose negative input receives the Q-axis torque current component error ($I_q^{LIM\_REQ}-I_q^{FBCK}$) from the multiplier 222 and the output, being the difference between its inputs, represents the difference value $\Delta I_d^{REQ}$ for the motor D-axis field current component.

The difference value $\Delta I_d^{REQ}$ for the motor D-axis field current component is applied to a field weakening proportional-integral control element 232, which generates an output value $I_d^{REQ\_FW}$ representing the value of the field weakening D-axis motor field current constituent for the required operating point $U_d^{REQ}$ for the motor field voltage component. The field weakening proportional-integral control element 232 produces a component proportional to its input and an integral component which accumulates progressively in time as a function of its input. A maximum value of zero is set as limit for the field weakening current component $I_d^{REQ\_FW}$ and its minimum value is set to the value $-I_d^{MAX}$ ensuring that the field current component will remain no greater than the rated phase current even in the absence of normal D-axis field current component. Between the bounds zero and $-I_d^{MAX}$, the output value $I_d^{REQ\_FW}$ representing the field weakening D-axis motor field current constituent is a continuously progressive function, without discontinuity, of the Q-axis voltage component headroom value $U_q^{LIM}-U_q^{REQ}$ and of the Q-axis torque current component error ($I_q^{LIM\_REQ}-I_q^{FBCK}$). The output value $I_d^{REQ\_FW}$ representing the field weakening D-axis motor field current constituent is then applied to an adder 233 in which it is added to a value $I_d^{NORM}$ representing the normal rated D-axis motor field current in the absence of field weakening to produce the required motor field current component $I_d^{REQ}$.

The field weakening module 110 also includes a module 234 which calculates the available Q-axis torque current component after the D-axis field current component $I_d^{REQ}$ is set, with a limit of $I^{MAX}$ (the maximum allowable current of the motor 102) by calculating:

$$I_q^{LIM}=\sqrt{((I^{MAX})^2-(I_d^{REQ})_2))}$$

This value $I_q^{LIM}$ and its inverse $-I_q^{LIM}$ are then placed as upper and lower limits on the required Q-axis torque current component value $1_q^{REQ}$ in a limiter 236 to produce the limited required Q-axis torque current component value $I_q^{LIM\_REQ}$.

In the case of a permanent magnet synchronous motor, where the field producing current is normally kept zero for speeds below the base speed, so that $I_d^{REQ}=0$ for speeds below base speed and $I_d^{REQ}<0$ during field weakening, adder 233 may be omitted. In this case $I_d^{REQ}=I_d^{REQ}{}_{FW}$ will have only negative or zero values (from $-I_d^{MAX}$ to zero) and $I_d^{NORM}=0$.

It will be appreciated that the embodiment of the invention of FIGS. 1 and 2 utilizes not only a difference/error between the actual and required Q-axis torque current component but also uses a difference between the required and limited Q-axis torque voltage component in setting a field weakening constituent ($I_d^{REQ\_FW}$) for the required operating point ($U_d^{REQ}$) for the motor field voltage component, and hence in setting a correct operating point for the field current and voltage components. This feature enhances the algorithm performance particularly in a case where a fast transition from an operating point at higher speed to an operating point at lower speed is needed.

In operation, when no field weakening is needed ($U_q^{REQ}<U_q^{LIM}$) the voltage component headroom is normally bigger than any torque current component adjustment needed, except for transient sharp command or load changes. Accordingly the field weakening module progressively increases the field weakening current component $-I_d$ towards zero.

When entering the field weakening region, as the motor speed exceeds the base speed, the torque required becomes bigger than that available ($I_q^{REQ}>I_q^{LIM\_REQ}$) because of torque current component limitation and increasing voltage saturation ($U_q^{REQ}>U_q^{LIM}$). The correction needed for $I_q^{REQ}$ becomes bigger than the headroom signal ($U_q^{LIM}-U_q^{REQ}$) $*I^{MAX}/U^{MAX}$ and the field weakening current component $-I_d$ becomes more negative.

When leaving the field weakening region, as the motor speed reduces and then becomes less than the base speed, the torque required becomes less than that available, because there is no longer torque current component limitation ($I_q^{REQ}<I_q^{LIM\_REQ}$) and there is sufficient voltage headroom ($U_q^{REQ}<U_q^{LIM}$). The correction needed for $I_q^{REQ}$ becomes smaller than the headroom signal ($U_q^{LIM}-U_q^{REQ}$)$*I^{MAX}/U^{MAX}$) and the field weakening current component $-I_d$ becomes less negative, tending towards zero.

Figure 3:
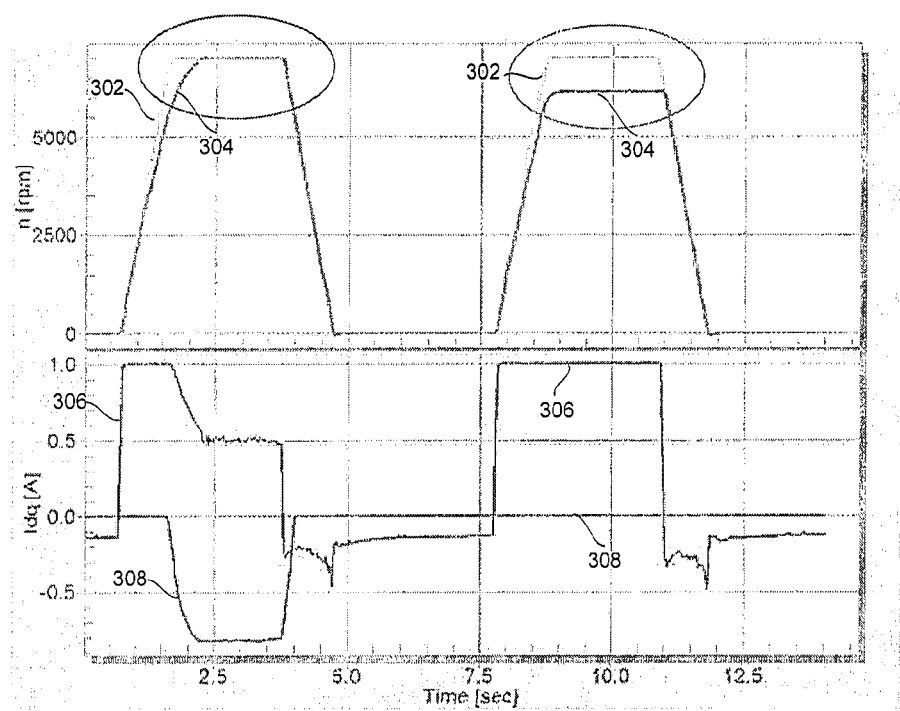

FIG. 3 shows the evolution with time, with and without field weakening, of motor variables desired speed 302, actual speed 304, required torque current component 306 and field weakening current component 308, for a permanent magnet motor, with a constant applied load torque. At time zero, the desired motor speed 302 is zero and the torque current is negative, countering the load torque, in order to maintain the motor speed at zero. At a time after 1 second, the desired speed 302 increases to 7000 revolutions per minute (rpm) and the required torque current component 306 increases to 1.0 A. The motor speed 304 accelerates to match the desired speed 302 and when it exceeds the base speed of the motor field weakening intervenes, after a delay due to the reaction times of the control loops, and reduces the field current and hence the back EMF. The required torque current component 306 decreases at a time between 2.5 and 3.5 seconds, as a result of current limitation $I_q^{LIM}=\sqrt{((I^{MAX})^2-(I_d^{REQ})^2)))}$ where the magnitude of the field current $I_d^{REQ}$ increases due to field weakening.

After time 3.5 seconds, the desired motor speed 302 is set to zero again. The torque current component 306 inverts, to decelerate the motor and once the motor speed reduces below the base speed of the motor, the field weakening current 308 reverts to zero, allowing the motor to operate at full field.

By contrast, operation without field weakening is illustrated starting after time 7.5 seconds, when the desired speed 302 increases to 7000 revolutions per minute (rpm) and the required torque current component 306 increases to 1.0 A. The motor speed 304 accelerates but fails to match the desired speed 302 when it exceeds the base speed of the motor, due to the back EMF, since no field weakening intervenes, even though the torque current is not limited by any field current.

Figure 4:
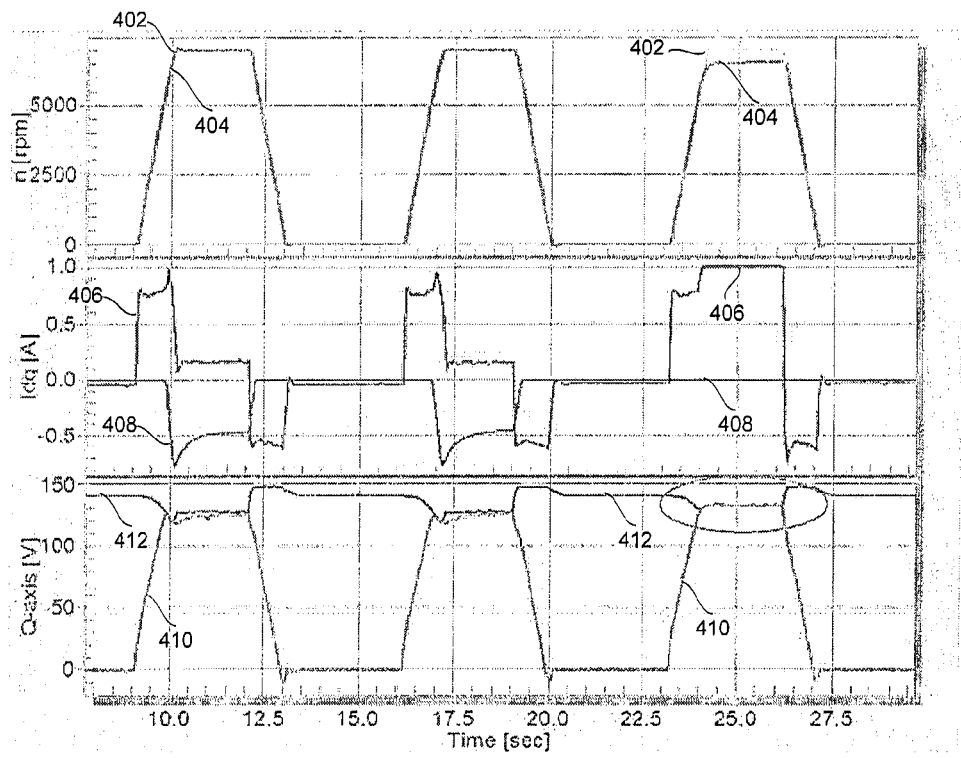

FIG. 4 is a similar illustration to FIG. 3 of the evolution with time, with and without field weakening, of motor variables desired speed 402, actual speed 404, required torque current component 406 and field weakening current component 408, for a permanent magnet motor, with a different level of applied load torque. The graph of torque voltage shows the required operating point 410 and the headroom 412 and shows that the operation with field weakening enabled results in control with unsaturated torque voltage whereas switching off the field weakening module results in saturation of the voltage 410 while the motor operates above base speed.

The embodiment of the invention of FIGS. 1 and 2 does not require setting the control loop parameters experimentally to achieve the best performance for a particular motor due to its systematic approach, in which both voltage and current limit conditions on the motor are respected. The parameters of the control loop can be evaluated explicitly.

It will be appreciated that the absence in the embodiment of the invention of FIGS. 1 and 2 of discontinuous elements in the control loop avoids creating additional non-linearity, which would result in a degraded stability of the system, and enables a smooth transition between field-weakening and field recovery operation.

The embodiment of the invention shown in FIGS. 1 and 2 may be implemented at least partially in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, bearing data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims.

Because the apparatus implementing the present invention is, for the most part, composed of electronic components, circuits and algorithms known to those skilled in the art, details are not explained in any greater extent than that considered necessary for the understanding and appreciation of the underlying concepts of the present invention and in order not to obfuscate or distract from the teachings of the present invention.

Embodiments of the invention may be implemented using a variety of different information processing systems. For example, although FIGS. 1 and 2 and the discussion thereof describe an exemplary architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between blocks are merely illustrative and that alternative embodiments may merge blocks or circuit elements or impose an alternate decomposition of functionality upon various logic blocks or circuit elements.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In the claims, reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method for control of an alternating current electric motor with field weakening, comprising:
setting a required operating point for a motor field voltage component as a function of a difference between actual and required motor field current components;
setting a required operating point for a motor torque voltage component as a function of a difference between actual and required motor torque current components;
setting a field weakening constituent for said required operating point for said motor field voltage component as a function of a difference between a required operating point and an available value of said motor torque voltage component and as a function of a difference between actual and required motor torque current components.

2. A method for control of an electric motor as claimed in claim 1, wherein setting said required operating point for a motor torque voltage component and setting said required motor torque current component include responding to values available after setting said required operating point for said field voltage component and setting a required motor field current component.

3. A method for control of an electric motor as claimed in claim 1, wherein setting said required operating points for said motor field voltage component and for said motor torque voltage component includes proportional-integral control in response to differences between their respective actual and required current components.

4. A method for control of an electric motor as claimed in claim 1, wherein setting said field weakening constituent of said required operating point for said motor field voltage component includes proportional-integral control in response to said difference between a required operating point and an available value of said motor torque voltage components and to said difference between actual and required motor torque current components.

5. A method for control of an electric motor as claimed in claim 1, wherein setting said required operating points for a motor field voltage component and for a motor torque voltage component includes setting limits for said motor field and torque voltage components as a function of an available supply voltage.

6. A method for control of an electric motor as claimed in claim 1, wherein setting said required motor field and torque current components includes setting limits for said motor field and torque current components.

7. A method for control of an electric motor as claimed in claim 1, wherein said motor field components are D-axis components of motor currents and voltages expressed in rotating coordinates and said motor torque components are Q-axis components of motor currents and voltages expressed in said rotating coordinates.

8. An apparatus for control of an electric motor with field weakening, comprising:
  a field control module for setting a required operating point for a motor field voltage component as a function of a difference between actual and required motor field current components;
  a torque control module for setting a required operating point for a motor torque voltage component as a function of a difference between actual and required motor torque current components;
  wherein said field control module is arranged to receive inputs from a field weakening module for setting a field weakening constituent of said required operating point for said motor field voltage component as a function of a difference between a required operating point and an available value of said motor torque voltage component and as a function of a difference between actual and required motor torque current components.

9. An apparatus for control of an electric motor as claimed in claim 8, wherein said torque control module is arranged to set said required operating point for a motor torque voltage component and said required motor torque current component in response to values available after said field control module sets said required operating point for said field voltage component and sets a required motor field current component.

10. An apparatus for control of an electric motor as claimed in claim 8, wherein said field control module and said torque control module include proportional-integral control elements for setting said required operating points for said motor field voltage component and for said motor torque voltage component in response to differences between their respective actual and required current components.

11. An apparatus for control of an electric motor as claimed in claim 8, wherein said field weakening module includes a proportional-integral control element for setting said field weakening constituent of said required operating point for said motor field voltage component in response to said difference between a required operating point and an available value of said motor torque voltage components and to said difference between actual and required motor torque current components.

12. An apparatus for control of an electric motor as claimed in claim 8, wherein said field control module and said torque control module are arranged to set limits for said motor field and torque voltage components as a function of an available supply voltage in setting said required operating points for a motor field voltage component and for a motor torque voltage component.

13. An apparatus for control of an electric motor as claimed in claim 8, wherein said field control module and said torque control module are arranged to set limits for said motor field and torque current components in setting said required motor field and torque current components.

14. An electric motor arrangement comprising an electric motor and apparatus for control of the electric motor as claimed in claim 8.

15. A method for control of an electric motor as claimed in claim 2, wherein setting said required operating points for said motor field voltage component and for said motor torque voltage component includes proportional-integral control in response to differences between their respective actual and required current components.

16. A method for control of an electric motor as claimed in claim 2, wherein setting said field weakening constituent of said required operating point for said motor field voltage component includes proportional-integral control in response to said difference between a required operating point and an available value of said motor torque voltage components and to said difference between actual and required motor torque current components.

17. A method for control of an electric motor as claimed in claim 2, wherein setting said required operating points for a motor field voltage component and for a motor torque voltage component includes setting limits for said motor field and torque voltage components as a function of an available supply voltage.

18. A method for control of an electric motor as claimed in claim 2, wherein setting said required motor field and torque current components includes setting limits for said motor field and torque current components.

19. A method for control of an electric motor as claimed in claim 3, wherein setting said required motor field and torque current components includes setting limits for said motor field and torque current components.

20. A method for control of an alternating current electric motor with field weakening, comprising:
  setting a required operating point for a motor field voltage component as a function of a difference between actual and required motor field current components;
  setting a required operating point for a motor torque voltage component as a function of a difference between actual and required motor torque current components;
  setting a field weakening constituent for said required operating point for said motor field voltage component as a function of a difference between a required operating point and an available value of said motor torque voltage component, wherein said difference between said required operating point and said available value of said motor torque voltage component is scaled with respect to a torque current component error, and as a function of a difference between actual and required motor torque current components.

* * * * *